(12) United States Patent
Chun

(10) Patent No.: US 7,907,556 B2
(45) Date of Patent: Mar. 15, 2011

(54) APPARATUS AND METHOD FOR CONTROLLING MOBILE TERMINAL IN DATA COMMUNICATION SYSTEM

(75) Inventor: Jin-Wook Chun, Seoul (KR)

(73) Assignee: Samsung Electronics Co., Ltd (KR)

( * ) Notice: Subject to any disclaimer, the term of this patent is extended or adjusted under 35 U.S.C. 154(b) by 727 days.

(21) Appl. No.: 11/871,546

(22) Filed: Oct. 12, 2007

(65) Prior Publication Data

US 2008/0089256 A1   Apr. 17, 2008

(30) Foreign Application Priority Data

Oct. 13, 2006   (KR) ................... 10-2006-0099658

(51) Int. Cl.
*H04B 7/00* (2006.01)
*H04W 4/00* (2009.01)
(52) U.S. Cl. ......................... 370/310; 455/466
(58) Field of Classification Search .............. 370/328, 370/338, 236, 522, 469; 455/466, 557
See application file for complete search history.

(56) References Cited

U.S. PATENT DOCUMENTS

| | | | |
|---|---|---|---|
| 2005/0220069 A1* | 10/2005 | Li et al. | 370/349 |
| 2005/0249179 A1* | 11/2005 | Yoshida | 370/342 |
| 2006/0153236 A1* | 7/2006 | Kang | 370/469 |
| 2006/0160569 A1* | 7/2006 | Chen et al. | 455/557 |
| 2006/0205397 A1* | 9/2006 | So et al. | 455/423 |
| 2007/0058640 A1* | 3/2007 | Bunn et al. | 370/395.52 |
| 2007/0140159 A1* | 6/2007 | Eronen et al. | 370/328 |
| 2007/0168579 A1* | 7/2007 | Croughwell et al. | 710/22 |
| 2007/0239987 A1* | 10/2007 | Hoole et al. | 713/169 |

* cited by examiner

*Primary Examiner* — Brian D Nguyen
(74) *Attorney, Agent, or Firm* — The Farrell Law Firm, P.C.

(57) ABSTRACT

Provided is an apparatus and method for controlling a mobile terminal in a data communication system. In the mobile terminal controlling apparatus, a network terminal generates an encapsulated control packet, which includes a control command for controlling the mobile terminal during data communication and predetermined port information, and transmits the encapsulated control packet to the mobile terminal. Then, the mobile terminal receives the encapsulated packet from the network terminal, decapasulates the received packet to see if the packet is a control packet. When the received packet is a control packet, the mobile terminal executes the control command included in the control packet.

15 Claims, 5 Drawing Sheets

APPARATUS AND METHOD FOR CONTROLLING MOBILE TERMINAL IN DATA COMMUNICATION SYSTEM

PRIORITY

This application claims priority under 35 U.S.C. §119 to an application filed in the Korean Intellectual Property Office on Oct. 13, 2006, entitled "Apparatus And Method For Controlling Mobile Terminal In Data Communication System" and assigned Serial No. 2006-99658, the contents of which are incorporated herein by reference.

BACKGROUND OF THE INVENTION

1. Field of the Invention

The present invention relates generally to an apparatus and method for controlling a mobile communication terminal in a data communication system, and in particular, to an apparatus and method for controlling a mobile communication terminal that involves data communication as a modem.

2. Description of the Related Art

A data communication system using a mobile communication terminal, which will hereinafter be simply referred to as a mobile terminal, is an environment where a mobile terminal is used as a modem and a personal computer or a laptop computer that controls the mobile terminal builds up a Point-to-Point Protocol (PPP) connection in a dial-up modem method and gets access to a network. The mobile terminal displays information on data reception and transmission.

FIG. 1 illustrates a conventional data communication system using a mobile terminal. Referring to FIG. 1, the conventional data communication system is composed of a network terminal 100, a mobile terminal 110 that functions as a modem and provides a data communication service to network terminal 100, a Packet Data Serving Node (PDSN) 120, Internet 130, and a destination host 140. PDSN 120 is connected to the Internet and provides a wireless data communication service.

In the conventional data communication system, it is impossible to use an application program such as searching a telephone number database and reading a Short Message Service (SMS) message in mobile terminal 100 or network terminal 100, such as a personal computer (PC) and a laptop computer, while mobile terminal 110 operates as a modem and involves data communication. The reason will be described below based on the protocol structure of the data communication system.

FIG. 2 illustrates the communication protocol structure of a conventional data communication system using a mobile terminal. Referring to FIG. 2, network terminal 100 creates Transmission Control Procedure (TCP) packets or User Datagram Protocol (UDP) packets and transmits the packets to communicate data with destination host 140. Mobile terminal 110 does not check encapsulated packet data transmitted from network terminal 100 and it operates as a repeater for repeating them to PDSN 120. Since a corresponding port is in use during the data communication, network terminal 100 cannot transmit a predetermined control command to mobile terminal 110. Therefore, the network terminal 100 cannot control the mobile terminal 110 with its control command.

For this reason, it is required to develop an apparatus and method that makes it possible to use a database and such applications as SMS in mobile terminal 110 through network terminal 100 even if the data communication system is in the middle of data communication.

SUMMARY OF THE INVENTION

An aspect of the present invention is to solve at least the above problems and/or disadvantages and to provide at least the advantages below. Accordingly, an aspect of the present invention is to provide an apparatus and method for controlling a mobile terminal in a data communication system.

Another aspect of the present invention is to provide an apparatus and method for controlling a mobile terminal that operates as a modem and is in the middle of data communication in a data communication system.

Yet another aspect of the present invention is to provide an apparatus and method for using an application program of a mobile terminal that is in the middle of data communication in a data communication system.

Still another aspect of the present invention is to provide an apparatus and method for using data stored in a mobile terminal that is in the middle of data communication in a data communication system.

According to one aspect of the present invention, in the mobile terminal controlling apparatus, a network terminal generates an encapsulated control packet, which includes a control command for controlling the mobile terminal during data communication and predetermined port information, and transmits the encapsulated control packet to the mobile terminal. The mobile terminal receives the encapsulated packet from the network terminal, decapasulates the received packet to see if the packet is a control packet. When the received packet is a control packet, the mobile terminal executes the control command included in the control packet.

According to another aspect of the present invention, in a controlling method in a mobile terminal during data communication, it is determined if a packet transmitted from a network terminal is a control packet for controlling the mobile terminal. When the received packet is a control packet, the mobile terminal executes the control command included in the control packet.

According to a further aspect of the present invention, in a method for controlling a mobile terminal that is in the middle of data communication in a network terminal, the network terminal generates a control packet including a control command for controlling the mobile terminal and predetermined port information, and transmits the control packet to the mobile terminal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 1:
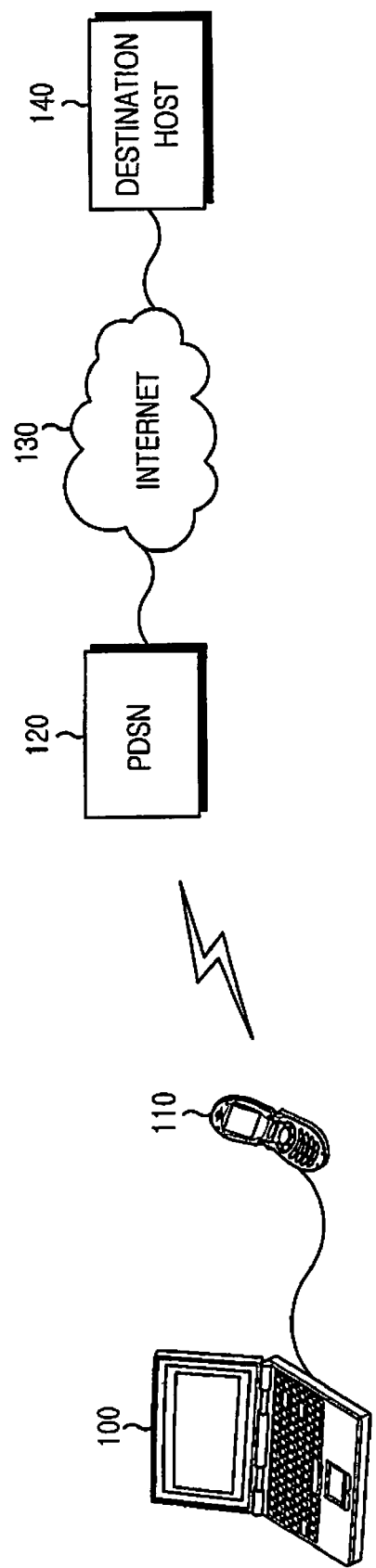
FIG. 1 illustrates a conventional data communication system using a mobile terminal.
Figure 2:
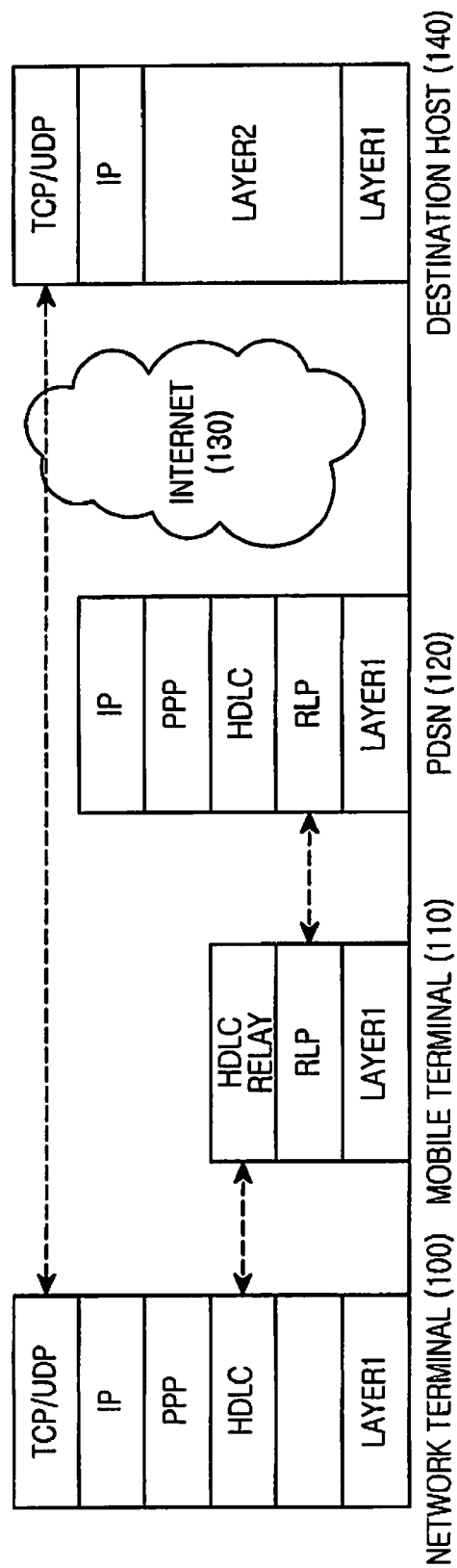
FIG. 2 illustrates a communication protocol structure of a conventional data communication system using a mobile terminal.

The present invention relates to an apparatus and method for controlling a mobile terminal involved in data communication as a modem in a data communication system using application programs or data stored in the mobile terminal. A data communication system provided in the present invention has the same configuration as the conventional data communication system shown in FIG. 1 but the functions of the constituent elements are expanded. Thus, the constituent elements of the data communication system suggested in the present invention will not be shown in a drawing.

The data communication system of the present invention will be described below based on a suggested protocol structure to control a mobile terminal.

Figure 3:
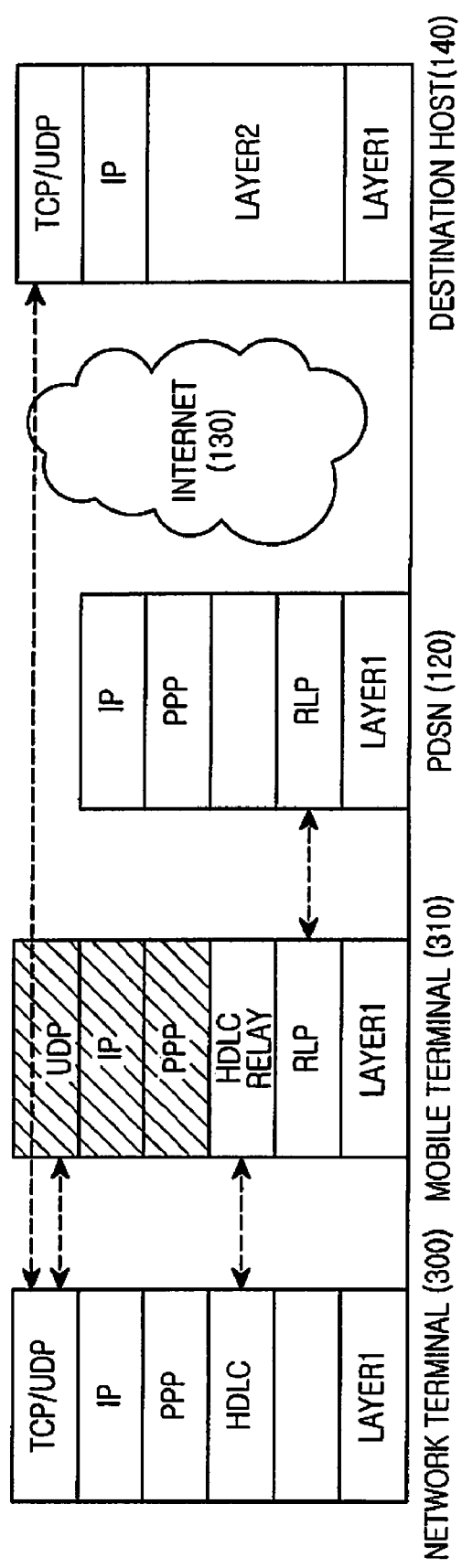
FIG. 3 illustrates a communication protocol structure of a data communication system using a mobile terminal according to the present invention.

Referring to FIG. 3, the data communication system is composed of a network terminal 300, a mobile terminal 310, a Packet Data Serving Node (PDSN) 120, Internet 130, and a destination host 140.

When network terminal 300 is to communicate data with destination host 140, it creates and transmits TCP or UDP packets according to a data communication protocol. When network terminal 300 controls mobile terminal 310 according to the present invention, it creates a control packet including a control command and predetermined port information, and transmits them to mobile terminal 310.

The control packet may be created in the form of a TCP packet or a UDP packet. However, since the circumstance that a control packet is created and transmitted signifies that mobile terminal 310 is already connected to network terminal 300 and network terminal 300 is in the middle of communication with destination host 140 through mobile terminal 310, it does not have to stubbornly assume that the control command is created in the form of a TCP packet which is mainly formed and used for connection. Therefore, the present invention will be described hereinafter based on an assumption that the control packet is a UDP packet.

Mobile terminal 310 receives an encapsulated packet, decapsulates the packet, and checks if the packet includes predetermined port information to figure out whether the packet is a control packet for controlling mobile terminal 310. If it is not a control packet, the packet is encapsulated again and transmitted to PDSN 120 to maintain data communication with destination host 140.

When the packet is a control packet, data search or an application program is executed upon receipt of the control packet including a control command, and an acknowledgement packet including predetermined port information and the execution result of the data search or the application program is created. The acknowledgement packet is transmitted to network terminal 300.

A method for controlling a mobile terminal in a data communication system of the aforementioned structure, which is suggested in the present invention, will be described hereinafter with reference to an accompanying drawing.

Figure 4:
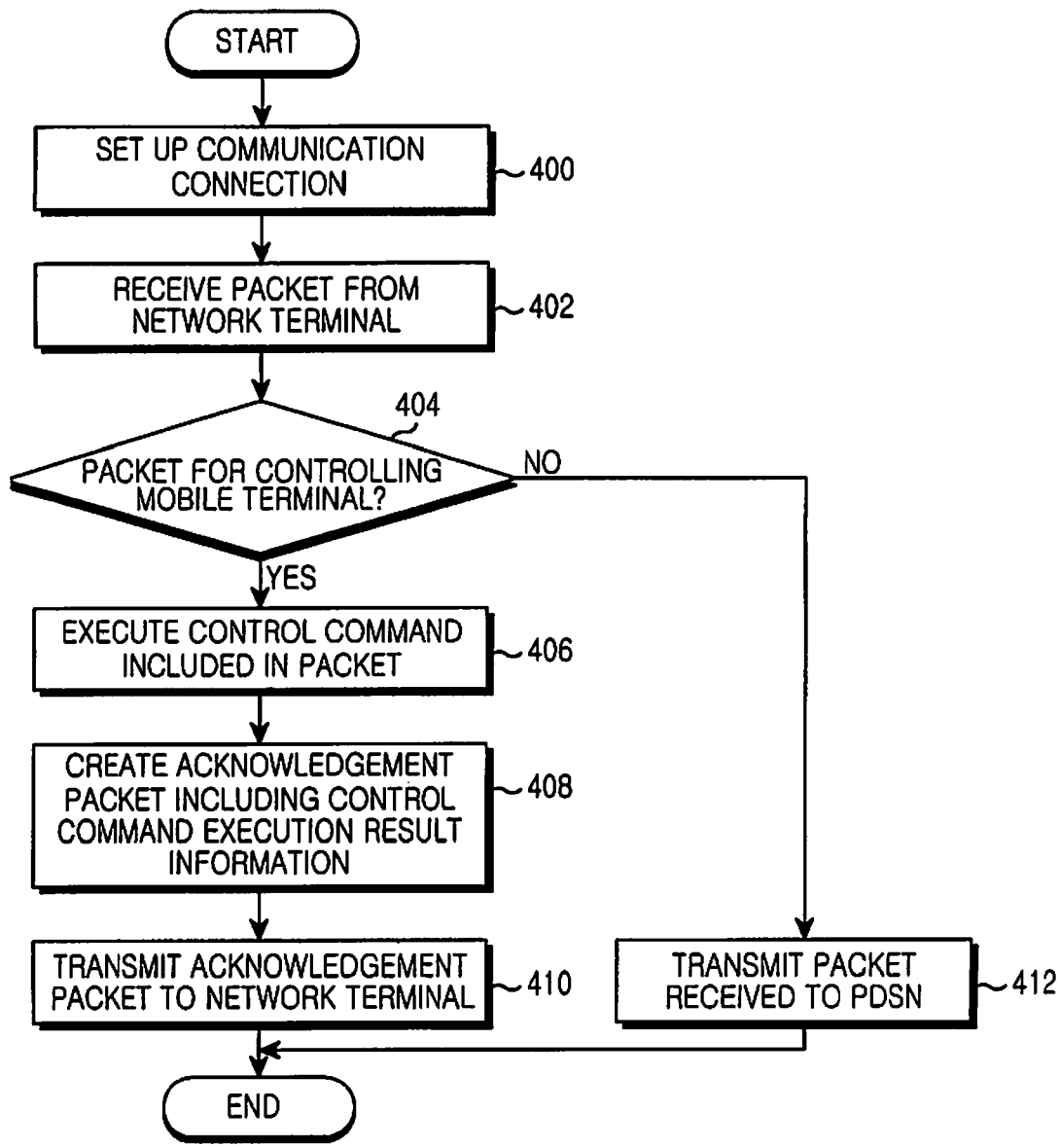
FIG. 4 is a flowchart for a mobile terminal controlled process during data communication in a data communication system according to the present invention.

Referring to FIG. 4, a mobile terminal involves in data communication as a modem in step 400, receives a packet from a network terminal in step 402, decapsulates the received packet to check whether or not the packet includes predetermined port information therein and see if the received packet is a control packet for controlling the mobile terminal and including the port information in step 404.

When it is determined in step 404 that the received packet is not a control packet for controlling the mobile terminal but a packet for data communication, the mobile terminal encapsulates the received packet and transmits it to a PDSN in step 412.

When it is determined in step 404 that the received packet is a control packet for controlling the mobile terminal, the mobile terminal executes the control command included in the control packet in step 406, generates an acknowledgement packet including the control command execution result and predetermined port information in step 408, and transmits the acknowledgement packet to the network terminal in step 410.

The control command execution of the mobile terminal in the step 406 includes searching a telephone number database stored in the mobile terminal, searching transmitted/received SMS messages, and executing an application program for transmitting an SMS message.

Figure 5:
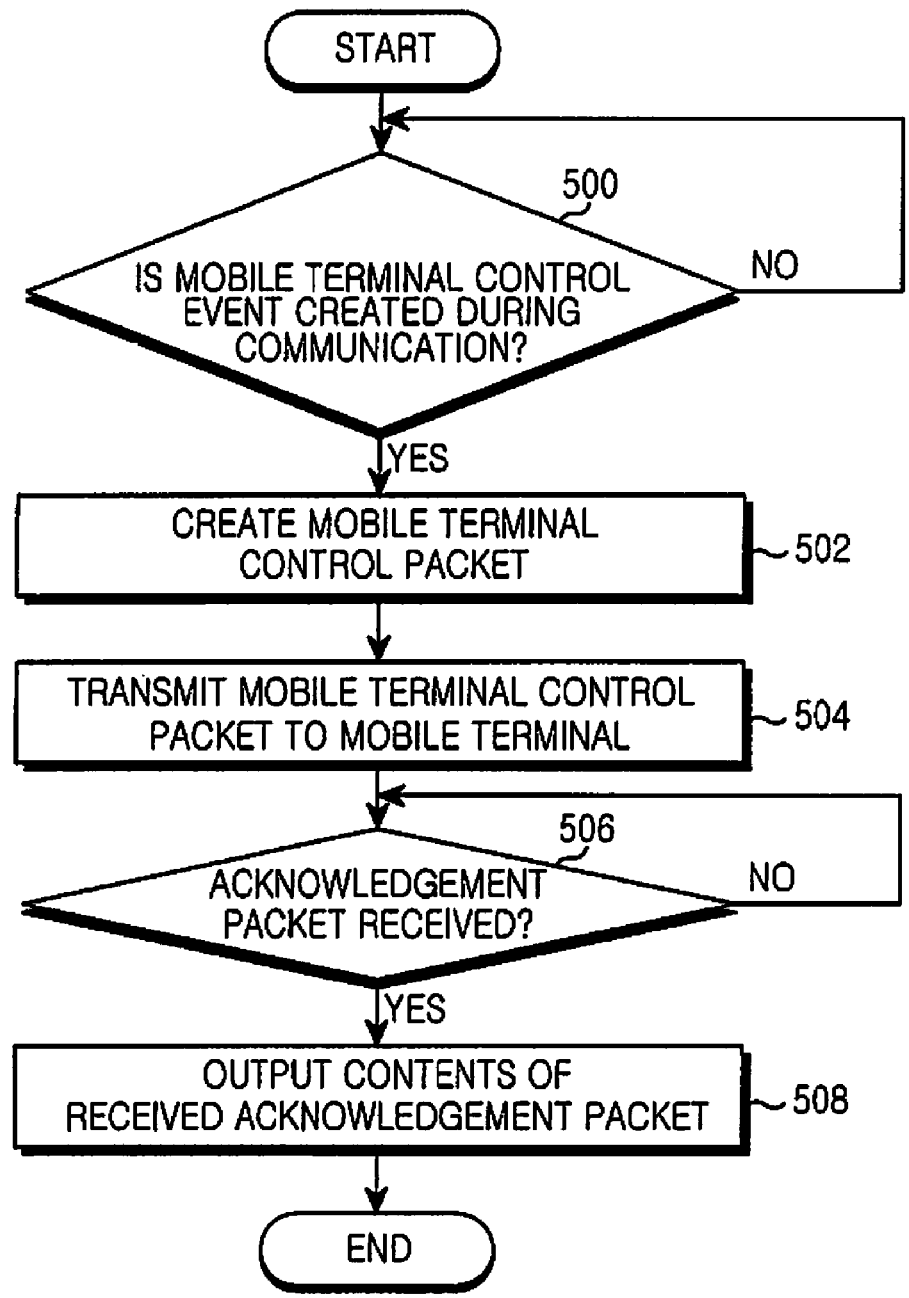
FIG. 5 is a flowchart for a process whereby a network terminal controls a mobile terminal in the middle of data communication in a data communication system according to the present invention.

Referring to FIG. 5, when a network terminal detects generation of an event for generating a mobile terminal in step 500 in the middle of communication via the mobile terminal, the network terminal generates a control packet including a control command and predetermined port information in step 502, transmits the control packet to the mobile terminal in step 504.

Subsequently, the network terminal receives an acknowledgement packet including the control command execution result from the mobile terminal in step 506, and it outputs the result information included in the acknowledgement packet in step 508.

As described above, the present invention provides an apparatus and method for using application programs or data stored in a mobile terminal while receiving and checking packets from a network terminal connected to the mobile terminal involved in data communication as a modem in a data communication system. The apparatus and method of the present invention makes it possible to perform diverse control on the mobile terminal, while the mobile terminal is in the middle of data communication.

While this invention has been described in connection with what is presently considered to be practical exemplary embodiments, it is to be understood that the present invention is not limited to the disclosed embodiments, but, on the contrary, is intended to cover various modifications and equivalent arrangements included within the spirit and scope of the appended claims.

What is claimed is:

1. A data communication system configured to control a mobile terminal during data communication, comprising:

a network terminal for generating an encapsulated control packet including a control command for controlling the mobile terminal during data communication and predetermined port information, and transmitting the encapsulated control packet to the mobile terminal; and the mobile terminal for receiving an encapsulated packet from the network terminal, decapsulating the received packet to see if the packet is a control packet, and when the received packet is a control packet, executing the control command included in the control packet, wherein after executing the control command, the mobile terminal generates an acknowledgement packet including control command execution result information and the predetermined port information, and transmits the acknowledgement packet to the network terminal, wherein when receiving the acknowledgement packet from the mobile terminal, the network terminal outputs the control command execution result information included in the acknowledgement packet.

2. The data communication system of claim 1, wherein the mobile terminal decapsulates the received packet and when the received packet includes the predetermined port information, determines the received packet to be the control packet.

3. The data communication system of claim 1, wherein the control command is a command for controlling an application program and data stored in the mobile terminal, and the control command includes a command for searching a telephone number database, a command for searching transmitted/received Short Message Service (SMS) messages, and a command for executing an application program for sending an SMS message.

4. The data communication system of claim 1, wherein the control packet and the acknowledgement packet are User Datagram Protocol (UDP) packets.

5. The data communication system of claim 1, wherein when the received packet is not a control packet, the mobile terminal re-encapsulates the received packet and transmits the re-encapsulated packet to a Packet Data Serving Node (PDSN).

6. A method for controlling a mobile terminal in a data communication system during data communication, comprising:
checking if a packet received from a network terminal is a control packet for controlling the mobile terminal, during data communication in the mobile terminal; and
executing a control command included in the control packet in the mobile terminal when the received packet is a control packet,
wherein the control command is a command for controlling an application program and data stored in the mobile terminal and the control command includes a command for searching a telephone number database, a command for searching transmitted/received Short Message Service (SMS) messages, and a command for executing an application program for sending an SMS message.

7. The method of claim 6, wherein the received packet is decapsulated to determine if the received packet includes predetermined port information, and when the received packet includes the predetermined port information, the received packet is determined to be the control packet.

8. The method of claim 6, further comprising after the execution of the control command:
generating an acknowledgement packet including control command execution result information and a predetermined port information; and
transmitting the acknowledgement packet to the network terminal.

9. The method of claim 8, wherein the control packet and the acknowledgement packet are User Datagram Protocol (UDP) packets.

10. The method of claim 6, wherein when the received packet is not a control packet, the mobile terminal re-encapsulates the received packet and transmits the re-encapsulated packet to a Packet Data Serving Node (PDSN).

11. A method for controlling a mobile terminal that is in the middle of data communication in a network terminal, comprising:
generating a control packet including a control command for controlling the mobile terminal and predetermined port information; and
transmitting the control packet to the mobile terminal; and
outputting a control command execution result after performing the transmission of the control packet to the mobile terminal, when receiving an acknowledgement packet including the control command execution result in response to the control packet from the mobile terminal.

12. The method of claim 11, wherein the control command is a command for controlling an application program and data stored in the mobile terminal, and the control command includes a command for searching a telephone number database, a command for searching transmitted/received Short Message Service (SMS) messages, and a command for executing an application program for sending an SMS message.

13. The method of claim 11, wherein the control packet and the acknowledgement packet are User Datagram Protocol (UDP) packets.

14. An apparatus for controlling a mobile terminal in a data communication system during data communication, comprising:
means for checking if a packet received from a network terminal is a control packet for controlling the mobile terminal, during data communication in the mobile terminal; and
means for executing a control command included in the control packet in the mobile terminal,
wherein the control command is a command for controlling an application program and data stored in the mobile terminal and the control command includes a command for searching a telephone number database, a command for searching transmitted/received Short Message Service (SMS) messages, and a command for executing an application program for sending an SMS message.

15. An apparatus for controlling a mobile terminal that is in the middle of data communication in a network terminal, comprising:
means for generating a control packet including a control command for controlling the mobile terminal and predetermined port information;
means for transmitting the control packet to the mobile terminal;
means for outputting the control command execution result after performing the transmission of the control packet to the mobile terminal, when receiving an acknowledgement packet including the control command execution result in response to the control packet from the mobile terminal.

* * * * *